United States Patent [19]

Siddiqui et al.

[11] 4,392,835
[45] Jul. 12, 1983

[54] SLICER DISCONNECT

[75] Inventors: Ehtisham U. A. Siddiqui; James L. Wenzel; John L. Butterfield, all of Erie, Pa.

[73] Assignee: General Electric Company, Burlington, Vt.

[21] Appl. No.: 239,017

[22] Filed: Feb. 27, 1981

[51] Int. Cl.³ .................................................. F16D 9/00
[52] U.S. Cl. .......................................... 464/32; 464/30
[58] Field of Search .................................... 464/30-32

[56] References Cited

U.S. PATENT DOCUMENTS

| | | | |
|---|---|---|---|
| 2,727,371 | 12/1955 | Troeger et al. | 464/32 X |
| 2,862,375 | 12/1958 | Miller | 464/32 X |
| 3,427,826 | 2/1969 | Anderson | 464/32 |
| 3,620,045 | 11/1971 | Butterfield | 464/32 X |

*Primary Examiner*—John Petrakes
*Attorney, Agent, or Firm*—Bailin L. Kuch

[57] ABSTRACT

A disconnect arrangement is useful for disconnecting high speed generators, such as those utilized in aircraft electrical systems, from a driving source, such as an aircraft engine. The disconnect coupling includes splined members at either end of a stub shaft which are coupled respectively to the generator and the engine. A carbide knife-edged plate is pivotable about one end of the plate and, in the normal or deactivated position, an extension of a solenoid armature prevents the knife-edge from contacting the stub shaft. When energized, the solenoid armature is retracted releasing its engagement with the knife-edged plate, and a spring forces the knife-edge to engage the stub shaft at a relatively thin-walled portion thereof. Friction generated causes localized heating and the relatively thin wall of the stub shaft becomes plastic, the stub shaft then separating into two portions effecting disconnection of the generator from the engine. A spring loaded, conical point bearing internal of the stub shaft maintains separation of the two portions, thus allowing the generator to coast to a stop while permitting the engine to remain operational.

6 Claims, 3 Drawing Figures

VIEW A-A

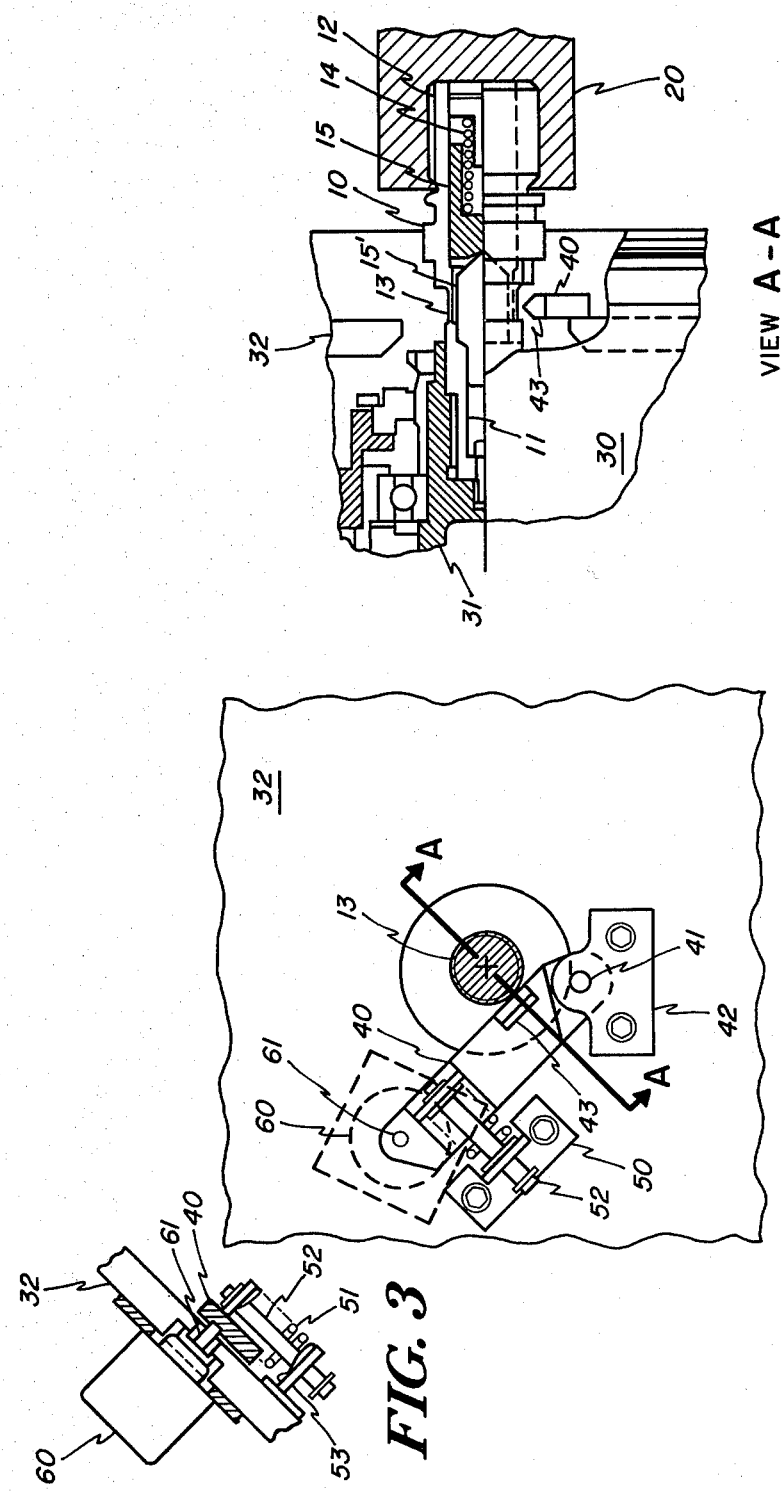

SLICER DISCONNECT

BACKGROUND OF THE INVENTION

1. Field of the Invention

The present invention relates to an improved disconnect device, and more particularly, to a device for disconnecting a driven device, such as a generator, from the driving source such as, for example, an aircraft engine.

2. Description of the Prior Art

In aircraft applications, the electrical system for supplying the electrical needs of the vehicle customarily incorporates one or more generators which are either directly driven from the engine or through a speed-reducing gearbox. These generators are customarily operated at high speeds which often are in excess of 10,000 rpm. Occasionally, one or more of the generators must be disconnected from the driving source lest serious damage be done to the generators and electrical system because of some malfunction which has already occurred or is about to occur. For example, the generator must be disconnected from the driving source if there is an actual or incipient bearing failure, excessive vibration, engine overspeed, excessive oil temperature, etc. Whenever any of these or other malfunctions occurs, rapid disconnect of the generator from the driving source is required to avoid serious damage to the equipment and to the system. Usually, sensors of various types are strategically distributed throughout the aircraft to sense the occurrence or incipient occurrence of these various conditions. These sensors generate a signal which produces an indication such as the lighting of a warning light, actuation of a buzzer, or the like, on the pilot's instrument panel. When the warning device is energized to indicate the malfunction, the pilot actuates a disconnect mechanism which removes the generator from the driving source.

Hitherto, two basic types of disconnect devices have been generally available: devices which can be classified generally as resettable and nonresettable. The resettable devices are of the type in which the generator, once disconnected, can be reconnected to the driving source without in any way disassembling or replacing components of the device. The non-resettable disconnects, on the other hand, usually involve rupturing, shearing, or fracturing of a connection between the driving source and the generator, and therefore require disassembly and replacement of certain components before the generator can be again placed on line. Both types of disconnect devices, while useful in many applications and circumstances, are subject to a number of failings which limit their utility. The resettable devices can be complex and bulky in construction since not only must they provide for disconnecting the generator, but they must also allow reconnection while the device still is rotating. Furthermore, the resettable devices require a substantial number of interacting components so that the reliability of the devices is often less than might be desired. The nonresettable disconnects, on the other hand, while simple in construction, also have some shortcomings. The replacement of parts which have been separated or sheared and the resetting of the shearing mechanism often take substantial amounts of time to accomplish. Consequently, a need exists for a simple but lightweight disconnect which has both resettable and replaceable components and which is capable of operating at high speeds and in which the disconnect function is carried out rapidly, effectively, and at any angular position of the rotating members, and in which the reset function is accomplished with a minimum of time and with a minimum of replacement parts.

It is therefore an object of the present invention to accomplish the above with a minimum of parts and in an efficient, reliable, and cost-effective fashion.

It is a further object of the present invention to provide a combination resettable and replaceable shaft disconnect arrangement in which the member which is ruptured to disconnect the shafts is inexpensive and is easily replaced.

Other objects and advantages of the invention will become apparent as the description thereof proceeds.

SUMMARY OF THE INVENTION

In accordance with the present invention, there is provided, in a coupling shaft having first and second splined ends for coupling respectively a high-speed driving member and a driven member, at least a portion of the axial length of the shaft having a relatively thin wall, means for selectively uncoupling the driving and the driven members. Slicing means are included for engaging the thin wall portion of the shaft and causing localized heating thereof thereby effecting severing of the shaft into two portions and uncoupling the driving and driven members. Means are provided for applying pressure to the slicing means for effecting speed-up of the heating and thereby the severing of the shaft. Selectively operable means are provided for preventing the slicing means under normal conditions from engaging the shaft and which upon operation releases the slicing means allowing engagement thereof with the shaft.

BRIEF DESCRIPTION OF THE DRAWING

In the accompanying drawing:

FIG. 1 is a front elevational view of the preferred embodiment of the present invention as it is incorporated and mounted upon the housing of a high-speed aircraft generator;

FIG. 2 is a view taken along line A—A of FIG. 1 and shows in more detail the coupling shaft of the preferred embodiment and its relationship to the driving and driven members; and FIG. 3 is a plan view showing in more detail a portion of the preferred embodiment of FIG. 1.

DESCRIPTION OF THE PREFERRED EMBODIMENT

In accordance with the present invention, and referring now generally to FIGS. 1 and 2, there is shown the preferred embodiment of the slicer disconnect of the present invention. A coupling shaft 10 includes first and second splined ends, 11 and 12, respectively, for coupling a high-speed driving member, such as shaft 20 of an aircraft engine, to a driven member such as the shaft 31 of the high-speed generator 30. Coupling stub shaft 10 is of hardened steel and is provided with at least a portion of its axial length having a relatively thin wall about the periphery thereof; this can be seen at 13 in FIG. 2 and more clearly in FIG. 1.

Means are provided for selectively uncoupling the driving and driven members, that is the engine 20 and generator 30, and includes slicing means, taking the form of a knife-edged plate 40 for engaging the thin wall portion 13 of the stub shaft 10 and for causing localized heating thereof for effecting severing of the shaft into two portions, thereby uncoupling the driving and driven members. Plate 40 is pivotally secured about one end through a pivot point 41 to a pivot plate 42 which is fixedly secured, as by machine screws, to the housing 32 of the generator 30. Plate 40 is fabricated of steel and is provided with a carbide tipped, knife edge 43.

Means are provided for applying pressure to the plate 40 for effecting speed-up of the heating process and thereby the severing of the stub shaft 10 and takes the form of a Bellevelle spring assembly 50 including a compression spring 51 secured about a pin 52 which is captivated between the plate 40 and a locating member 53 which is secured, as by machine screws, to the housing 32 of the generator 30.

Referring generally now to FIGS. 1 and 3, selectively operable means are provided for preventing the knife edge 43 under normal conditions from engaging the shaft 10 at thin wall portion 13, and which upon operation releases the knife edge 43 allowing engagement thereof with the shaft; this takes the form of a solenoid 60 having an armature shaft 61 which engages plate 40 through a strategically placed blind hole in the plate. Solenoid 60 is fixedly secured to the housing 32 of generator 30.

As seen in the drawing, the slicer disconnect of the present invention is in the deactivated position, the solenoid armature shaft 61 engaging the plate 40 and preventing it from contacting the stub shaft 10. When the solenoid 60 is energized, the armature shaft 61 is retracted from engagement with the plate 40 and the compression spring 51 forces the plate 40 through its knife edge 43 into engagement with the thin wall section 13 of stub shaft 10. Because the stub shaft 10 is rotating at high speed, friction between the carbide edge 43 and the thin wall section 13 of the hardened steel shaft causes the thin wall section to become plastic due to the localized heating and results in the separation of the stub shaft into two portions. Means are provided for maintaining separation between the severed edges of the two severed shaft portions, this taking the form of a spring-loaded, conical point bearing located within the stub shaft 10. Specifically, a captivated spring 14 exerts pressure upon the two surfaces of conical point bearing 15 and 15', rotation being had between the conical point bearing surfaces 15 and 15', while separating the severed generator end portion of the stub shaft 10 from the motor end portion thereof. Thus, while the engine continues its rotation, the generator end of the stub shaft 10 and thereby the generator are able to coast down to a stop.

The slicer disconnect of the present invention may be arranged such that upon the detection by some suitable means of an abnormal condition, such as a sensed temperature above a predetermined level or a sensed vibration above a predetermined level, an indication such as a buzzer sounding or the lighting of a pilot light may be given to the pilot in an aircraft so that he might manually effect operation of the device. Likewise operation of the slicer disconnect may be automatic such that upon the sensing of some predetermined external condition, the solenoid is automatically actuated so as to allow the engagement of the slicer disconnect knife edge with the stub shaft and the ultimate resultant shearing into two components thereof.

The slicer disconnect has the advantage of being easily resettable. With the solenoid armature 61 not in position so as to engage the plate 40, the knife edge 43 can be moved away from the stub shaft 10 by simply removing the machine screws holding the pivot plate 42. The two severed portions of the stub shaft 10 then can be pulled out and a new stub shaft placed in position. The pivot plate 42 is reassembled and the springs are compressed allowing the solenoid armature 61 to engage the plate 40. It is estimated that this operation of resetting/replacement can be done in less than 15 minutes. It is furthermore important that for a high-speed disconnect of the type described herein, that the total time of operation be kept at a minimum. The slicer disconnect of the present embodiment has been built and has operated satisfactorily and calculations indicate that the time of separation, that is the time required for the solenoid to receive the signal and retract the pin thereby freeing the knife edge, is less than 100 ms.

From the foregoing description, it can be readily appreciated that a resettable/replaceable disconnect mechanism for a generator, and particularly for a high speed aircraft generator, has been provided which is capable of disconnecting the generator from the driving source rapidly and efficiently at high speeds which characterize aircraft generators.

While a disconnect mechanism has been described in what is presently considered to be a preferred embodiment of the invention, it will be apparent to those skilled in the art that various changes and modifications may be made in the structure and in the instrumentalities utilized without departing from the true spirit and scope of the invention.

What is claimed is:

1. A shaft quick disconnect mechanism for intercoupling a high-speed driving shaft and a driven shaft, comprising:
    a coupling shaft having an axis of rotation and its one end fixed against torsional relative movement with said driving shaft and its other end fixed against torsional relative movement with said driven shaft, and having a tubular intermediate portion of thin annular cross-section;
    means for severing said coupling shaft at said intermediate portion thereof including:
        slicing means having an edge portion and having a first disposition whereat said edge portion is spaced from said tubular intermediate portion and a second disposition whereat said edge portion is in tangential abutment with the periphery of said tubular intermediate portion;
        detent means having a first disposition whereat it engages said slicing means and retains said slicing means in its first, spaced disposition and a second disposition whereat it is disengaged from said slicing means;
        biasing means coupled to said slicing means for translating said slicing means, effective after said detent means has moved from its first, engaged disposition to its second, disengaged disposition, from said first, spaced disposition to said second, tangential abutment disposition, whereat said edge portion is in biased engagement with said tubular intermediate portion and as said driving shaft turns said coupling shaft said edge portion rubs against said tubular intermediate portion to provide a frictional force which provides localized heating of said tubular intermediate portion to cause plastic deformation and rupture of said tubular intermediate portion.

2. A mechanism according to claim 1 wherein:
    said slicing means includes a level which has one end mounted by a pivot at a fixed distance from the axis of rotation of said coupling shaft and its other end has means to interlock with said detent means.

3. A mechanism according to claim 2 wherein:
said biasing means includes compression spring means which has one end mounted at a fixed distance from the axis of rotation of said coupling shaft and its other end coupled to said other end of said lever of said slicing means.

4. A mechanism according to claim 1 wherein:
a conical point bearing assembly is disposed within said coupling shaft to provide alignment support between said driving and driven shafts along the axis of rotation of said coupling shaft subsequent to the rupture of said tubular intermediate portion.

5. A mechanism according to claim 4 wherein:
said conical point bearing assembly includes:
- a conical point,
- a conical cup receiving said point,
- spring means biasing said point and cup into longitudinal engagement along the axis of rotation of said coupling shaft.

6. A mechanism according to claim 1 wherein:
said tubular portion is made of hardened steel, and said edge portion is made of carbide.

* * * * *